United States Patent [19]

Ward et al.

[11] Patent Number: 5,051,386

[45] Date of Patent: Sep. 24, 1991

[54] SILICA-ALUMINA CATALYST CONTAINING PHOSPHORUS

[75] Inventors: John W. Ward; Dennis D. Delaney, both of Yorba Linda, Calif.

[73] Assignee: Union Oil Company of California, Los Angeles, Calif.

[21] Appl. No.: 516,266

[22] Filed: May 23, 1990

[51] Int. Cl.$^5$ .................... B01J 21/04; B01J 21/08; B01J 27/182

[52] U.S. Cl. ........................ 502/64; 502/214

[58] Field of Search .................. 502/214, 64

[56] References Cited

U.S. PATENT DOCUMENTS

| | | | |
|---|---|---|---|
| 3,213,035 | 10/1965 | Morrell | 502/214 |
| 3,544,926 | 1/1971 | Statman et al. | 502/214 |
| 4,636,483 | 1/1987 | Kjell et al. | 502/214 X |
| 4,650,783 | 3/1987 | Chao et al. | 502/214 X |
| 4,681,864 | 7/1987 | Edwards et al. | 502/214 X |

*Primary Examiner*—W. J. Shine
*Attorney, Agent, or Firm*—Alan H. Thompson; Gregory W. Wirzbicki

[57] ABSTRACT

Catalysts containing a dispersion of silica-alumina in alumina, either alone or with phosphorus components supported thereon, are employed to promote hydrocarbon conversion reactions, particularly oligomerization reactions. The dispersion preferably contains a silica-alumina cogel or copolymer dispersed in an alumina matrix. Such catalysts have strong integrity and are easily unloaded from reactor vessels.

19 Claims, No Drawings

SILICA-ALUMINA CATALYST CONTAINING PHOSPHORUS

BACKGROUND OF THE INVENTION

The invention relates to novel catalysts for hydrocarbon conversion processes, particularly polymerization and oligomerization processes.

In the refining of hydrocarbon containing feedstocks, it is often necessary to convert hydrocarbon compounds contained in the feedstock to different forms. Typically, particulate catalysts are utilized to promote chemical reactions when feedstocks contact such catalysts under hydrocarbon conversion conditions to produce economically upgraded hydrocarbon products.

An on-going aim of the art is to provide a catalyst having suitably high activity, stability and/or selectivity for a given product. Activity may be determined by comparing the temperature at which various catalysts must be utilized under otherwise constant processing conditions with the same feedstock so as to produce a given percentage of products boiling in a given temperature range. The lower activity temperature for a given catalyst, the more active such a catalyst is in relation to a catalyst of higher activity temperature. Alternatively, activity may be determined by comparing the percentages of conversion of feedstock reactants to products boiling in a given range when various catalysts are utilized under otherwise constant processing conditions with the same feedstock. The higher the percentage of product converted to the given boiling range for a given catalyst, the more active such a catalyst is in relation to a catalyst converting a lower percentage of the same feedstock reactants to the same products. Selectivity may be determined during the foregoing described activity test and is measured as the percentage of a given product boiling in a given temperature range. Stability is generally measured in terms of the change in temperature required per unit of time to maintain a given percentage of product, or alternatively, in terms of the change in percentage of product per unit of time. The lower the change in percentage of product per time unit for a given catalyst, the more stable such a catalyst is in relation to a catalyst yielding a greater change.

Catalytic oligomerization is a useful process for the conversion of relatively low molecular weight olefins into industrially important olefins of higher molecular weight. Solid phosphoric acid catalysts have been utilized for such operations. A typical catalyst is phosphoric acid supported on kieselguhr. Such a catalyst provides suitable oligomerization activity (i.e., percentage conversion of lower molecular weight olefins to liquid products containing higher molecular weight olefinic oligomers); however, the catalyst structurally degrades during processing which causes large pressure drops through the reactor vessel. Such pressure drops mandate frequent shut downs of the oligomerization process in order to replace the catalyst. Furthermore, degradation of the catalyst also causes a difficult catalyst unloading problem wherein hydrostatic drilling is often necessitated to remove the degraded catalyst from the internal surfaces of the reactor vessel.

The search continues for catalysts providing suitable hydrocarbon conversion activity and stability, particularly oligomerization activity and stability, and also improving the problem of unloading spent catalysts.

SUMMARY OF THE INVENTION

The invention provides a catalyst containing a dispersion of silica-alumina in an alumina matrix, either alone or with phosphorus components supported thereon, which is utilized to promote hydrocarbon conversion reactions. The silica-alumina is typically a cogel or copolymer which comprises about 5 to about 98 weight percent of the support and the phosphorus content is greater than about 0.5 weight percent. The phosphorus-containing catalyst is essentially free of supported metals and essentially free of Group VIB and Group VIII metals.

The phosphorus-containing catalyst, as well as a catalyst consisting essentially of the dispersion, is particularly effective for promoting oligomerization reactions. The catalysts are typically contacted under oligomerization conditions with hydrocarbon compounds containing at least one unsaturated carbon-to-carbon bond, such as olefins or alkynes, to produce higher molecular weight oligomers. For instance, a propylene-containing feedstock can be converted to gasoline and diesel product fractions.

Advantages derived from utilizing such catalysts include operating the oligomerization process at substantially lower temperatures than conventional processes, extending the processing term before shut down and providing an easily unloadable catalyst from the reactor vessel.

DETAILED DESCRIPTION OF THE INVENTION

The invention is directed to a novel catalyst and a novel process for converting a hydrocarbon-containing feedstock (liquid or gas) to upgraded hydrocarbon products. More specifically, oligomerization reactions are promoted by a catalyst comprising a dispersion of silica-alumina in alumina. Such dispersions contain about 5 to about 98 weight percent of a finely divided, silica-alumina component dispersed in an alumina matrix, although it is preferred that the dispersion contain about 20 to about 90 weight percent of the silica-alumina component. The silica-alumina component of the dispersion preferably contains a silica-alumina cogel or copolymer containing about 35 to 96, and most preferably about 50 to about 90 weight percent $SiO_2$. The novel and preferred catalysts contain a phosphorus component supported on the dispersion of silica-alumina in alumina.

Among the useful catalyst materials for use in the present invention are the dispersions disclosed in U.S. Pat. Nos. 4,097,365 and 4,738,767, herein incorporated by reference in their entireties. However, in contrast to the teachings in such patents of the combinations of Group VIB metals, Group VIII metals and phosphorus supported on the dispersions, the catalysts employed in the present invention are essentially free of Group VIB and Group VIII metals, and more preferably essentially free of any supported metal components. The preferred catalyst of the invention consists essentially of phosphorus components supported on the dispersion material. In another embodiment of the present invention, the catalyst consists essentially of the dispersion itself, i.e. the catalyst contains 100 percent of the dispersion without supported phosphorus components. In still another embodiment, the catalyst can contain the dispersion (with or without supported phosphorus thereon) as a component of a support containing a combination of discrete finished dispersion materials further dispersed with porous refractory oxides such as aluminas, titanias, molecular sieves, and the like. Molecular sieves include alumino-silicates such as zeolites, and also nonzeolitic molecular sieves whose frameworks are not formed of substantially only silica and alumina tetrahedra as are contained in zeolites. Such combinations of porous refractory oxides and dispersions can further contain conventional binder materials. In comparison to the supported metal catalysts of the above-mentioned patents utilized in cracking or hydrocracking reactions wherein higher boiling components are converted to lower boiling components, in the process of the present invention involving oligomerization, the non-metal containing catalysts described herein promote the conversion of lower boiling (often gaseous) components to higher boiling products (often liquids).

The catalysts and supports described herein contain the dispersion of silica-alumina in alumina. Supports hereinafter, whether utilized alone as the catalyst or as the support thereof, contain the dispersion materials. The dispersion, whether utilized alone as the catalyst or as the support thereof or a component of such support, is an amorphous material. Preferably, the finished dispersion consists essentially of amorphous materials, e.g., is devoid of crystalline materials such as crystalline zeolitic or nonzeolitic molecular sieves. The catalysts, supports or support components are composed of an alumina gel matrix (preferably a large pore alumina), in which a finely divided, intimately composited silica-alumina component is dispersed. Typically, these dispersions are non-crystalline, amorphous supports prepared by comulling an alumina hydrogel with a homogeneous silica-alumina cogel in hydrous or dry form, or with a "graft copolymer" of silica and alumina, and subsequently extruding the homogenized mixture to provide extrudates of the support of about 1/32 to about ⅛ inch cross-sectional diameter. Alternatively, to provide a more highly porous structure, the homogeneous mixture may first be spray-dried, then remulled with added water and extruded. Amorphous silica-alumina cogel components are prepared by conventional coprecipitation methods, e.g., as described in U.S. Pat. No. 3,210,294. Amorphous silica-alumina graft copolymers are prepared in a known manner by impregnating silica hydrogel with an aluminum salt followed by precipitation of alumina gel with ammonium hydroxide in the pores of the silica hydrogel. Usually, the dispersion contained in the support comprises at least 5 percent by weight of the support, and preferably at least 50 percent by weight, with the balance comprising a binder such as one or more porous, amorphous refractory oxides such as aluminas, titanias, etc., clays, and the like. Most preferably, the support contains about 80 to 100 percent by weight of the dispersion. The composition and principal physical characteristics of the dried and calcined supports fall within the approximate ranges:

TABLE I

| | Broad Range | Preferred Range |
|---|---|---|
| Wt. % Cogel or Copolymer | 5–98 | 20–90 |
| Wt. % SiO$_2$ in Cogel or Copolymer | 20–96 | 50–90 |
| Overall SiO$_2$ Content of Support, Wt. % | 5–80 | 35–80 |
| Pore Volume, ml/g | 0.5–2.0 | 0.8–2.0 |
| Surface Area, m$^2$/g | 150–700 | 300–600 |
| Av. Pore Diameter, Ang. | 50–150 | 70–130 |
| Percent of Pore Volume in Pores of Diameter Greater Than: | | |
| 100 Ang. | 10–80 | 25–70 |
| 500 Ang. | 5–60 | 20–50 |

Furthermore, the cross sectional shapes of the extruded, dried and calcined supports disclosed herein are preferably trilobal or tetralobal. Examples of such shaped supports are disclosed in U.S. Pat. No. 4,610,973, which is incorporated by reference herein.

In order to provide more suitable catalytic activity, the support is composited with phosphorus. Phosphorus is generally employed in the range between about 0.5 and about 15, preferably about 1 to about 8 and most preferably about 2 to about 7, weight percent, calculated as P.

Phosphorus may be added to the support by several methods which can provide a homogeneous and intimate dispersion thereof on the support. The phosphorus component(s) may be incorporated into the wet support mixture during the mulling stage prior to extrusion. However, the phosphorus is preferably added by impregnation with an aqueous solution thereof, after drying and calcining of the support particles. Impregnation may be accomplished using a single mixed impregnation solution or the phosphorus may be added partially in sequential impregnations with intervening drying and/or calcining.

Preferred phosphorus compounds for impregnation or comulling comprise an acid of phosphorus, such as metaphosphoric acid, pyrophosphoric acid, phosphorous acid, but preferably orthophosphoric acid, or a precursor, that is, a phosphorus-containing compound capable of forming a compound containing at least one acidic hydrogen atom when in the presence of water, such as phosphorus oxide, phosphorus, or the like. Following impregnation, the catalyst is dried and calcined in a free oxygen-containing gas such as air in a conventional manner at elevated temperatures such as about 370° C. to about 650° C.

Catalysts of the invention, particularly those containing phosphorus, may be employed in any of several hydrocarbon conversion processes wherein catalytic composites containing acidic support material are known to be catalytically effective. Typical processes include oligomerization, alkylation, polymerization, oxidation, desulfurization, denitrogenation, isomerization, reforming, and the like.

The term "hydrocarbon conversion" refers to any reaction wherein a hydrocarbon compound changes chemical composition. As used herein, "hydrocarbon" refers to any compound which comprises hydrogen and carbon, and "hydrocarbon-containing feedstock" refers to any charge stock which contains greater than about 90 weight percent carbon and hydrogen, calculated as the elements. Contemplated for treatment by the process of the invention are hydrocarbon-containing liquids and gases, including broadly all liquid, liquid/vapor and vapor hydrocarbon mixtures including petroleum oils and synthetic crudes. Among the typical oils contemplated are top crudes, vacuum and atmospheric residual fractions, light and heavy atmospheric and vacuum distillate oils, shale oils, and oils from bituminous sands and coal compositions and the like. Hydrocarbon compounds converted by the process of the invention include all forms, such as aliphatic, cycloaliphatic, olefinic, aromatic—including alkaryl and arylalkyl aromatic compounds and derivatives thereof—in addition to organometallic, organonitrogen, and organosulfur compounds, particularly those found in conventional hydrocarbon-containing feedstocks.

The catalyst may be employed as either a fixed, slurried or fluidized bed (but most usually a fixed bed) of particulates in a suitable reactor vessel wherein a hydrocarbon-containing feedstock (liquid, gaseous, or mixtures thereof) to be treated is introduced and subjected to hydrocarbon conversion conditions including an elevated total pressure, temperature, and optionally a hydrogen partial pressure, so as to effect the desired degree of conversion.

Typical hydrocarbon conversion operation conditions include a temperature from about room temperature to about 500° C., a pressure from subatmospheric to about 4,000 p.s.i.g., and a liquid hourly space velocity of about 0.05 to about 25 vol/vol-hr. In the presence of hydrogen, the hydrocarbon-containing feedstock contacts the catalyst under hydroprocessing conditions including a hydrogen recycle rate usually about 1,000 to about 15,000, and preferably about 3,000 to about 10,000 standard cubic feet per barrel (scf/bbl).

Preferably, chemical reactions, including hydrocarbon conversion reactions such as polymerization, oligomerization and alkylation, may be promoted by contact of hydrocarbon compounds contained in the feedstock under reaction conditions with a catalyst described herein to produce product hydrocarbon compounds having a greater molecular weight than those of the feedstock. For example, polymerization of hydrocarbons, especially olefins, at elevated temperatures, usually between about 0° C. and about 450° C., and at pressures from about atmospheric to about 1500 psig, may be promoted by the catalysts described herein, particularly by a catalyst containing supported phosphorous components. Hydrocarbon compounds having at least one unsaturated carbon to carbon bond, including monomers such as ethylene, styrene and propylene, and conjugated polyenes such as 1,3-butadiene, 2,3-dimethyl-1,3-butadiene, 1,3-pentadiene, 1,3,5-hexatriene and 1,4-pentadiene, are contacted with catalysts containing an amorphous silica-rich heterogeneous support under polymerization conditions including an elevated temperature, up to about 200° C., and a superatmospheric pressure less than about 1,500 psig, so as to produce polymers including homopolymers, copolymers and polymers from conjugated polyenes. Typically produced homopolymers include polyethylene, polystyrene and polypropylene, while copolymers include ethylene-propylene and ethylene-propylene-conjugated polyenes. For example, a catalyst containing an amorphous heterogeneous silica-rich support of the invention and at least 1 weight percent of phosphorus compound is contacted with an ethylene monomer and hydrogen under pressure from about 150 to about 250 psig and at polymerization temperatures, and after the desired polymerization time, the resulting polymer (containing polyethylene) is recovered by filtration followed by evaporation of solvent residue. Furthermore, the catalyst promotes organic chemical reactions involving the alkylation of aromatic compounds such as phenol, benzene and xylene with alkylating materials such as olefins, alcohols, alkyl halides, alkyl sulfates and the like, under reaction conditions including an elevated temperature, typically between about 0° C. and about 450° C., and a pressure from about atmospheric to about 1,500 psig.

The catalyst described herein is particularly suited for promoting an oligomerization reaction, as for example, a reaction in a process for oligomerizing hydrocarbon compounds. Typically, the hydrocarbon compounds have at least one unsaturated carbon to carbon bond, such as olefins and alkynes. A hydrocarbon containing feedstock, ordinarily containing one or more normally gaseous olefins present in the effluent of, for instance, a catalytic cracking zone, may be introduced into an oligomerization reaction zone, under oligomerization conditions, wherein the reaction zone contains a fixed bed or fluidizable oligomerization catalyst containing the heterogeneous support of the invention such that the feedstock contacts and/or fluidizes the catalysts and the feedstock-containing hydrocarbon compounds are converted to higher boiling oligomers such as dimers, trimers, tetramers, and the like. The preferred olefins to be oligomerized are gaseous straight or branched chain olefins including ethylene, propylene, butene, butadiene, hexene, mixtures of these, and the like, from sources such as effluents from olefin production plants, FCC off gas, syngas (by use of CO reduction catalysts), alkanols and thermal cracking off gas. Ordinarily the oligomerization feedstocks do not contain aromatic compounds. In a typical oligomerization process of the invention, a propylene-rich feedstock (i.e., containing more than about 20 volume percent propylene) is converted to higher boiling (liquid at room temperature and pressure) oligomers, including substantial proportions of hexene (dimer), nonene (trimer) and dodecene (tetramer). Nonene and tetramer are referred to herein as those hydrocarbon fractions which boil in the range from 138° C. to 149° C. and 177° C. to 202° C., respectively.

The reaction conditions under which fluidized oligomerization reactions take place include pressures from subatmospheric to about 500 atmospheres, but usually 10 atmospheres or less, and preferably about 100 to about 2,000 psig when a fixed bed catalyst is employed. The reaction zone is typically operated below about 400° C., usually about 50° C. to about 350° C., and preferably below about 210° C. and most preferably in the range from about 75° C. to about 150° C. Gas hourly space velocities sufficient to fluidize the catalyst are used, ordinarily from about 1,000 to 3,000. In the fixed bed case, weight hourly space velocities (WHSV) from about 0.1 to about 10 w/w-hr usually less than 5 w/w-hr, and preferably less than 1.20 w/w-hr are employed. In such processes, substantial amounts of the feedstock-containing olefins are converted to higher boiling olefinic oligomers, particularly when the amorphous heterogeneous silica-alumina/alumina catalyst also contains at least one supported phosphorus component.

In the process of oligomerizing olefins, the hydrocarbon-containing products typically comprise fractions that boil in the gasoline and diesel ranges. The gasoline and diesel fractions are referred to herein as those hydrocarbon-containing products boiling in the range from 29° C. to 224° C. and 177° C. to 343° C., respectively. The selectivity of a gasoline or diesel product is dependent upon the catalyst and processing parameters. For instance, the temperature of the process can be controlled to provide greater stability as well as selectivity toward a given product. Selectivity toward lower boiling hydrocarbon-containing liquids can result from contacting the catalysts described herein with an olefin-containing feedstock at a relatively low oligomerization temperature, whereas selectivity toward a higher boiling hydrocarbon-containing liquid can result when the process is conducted at relatively higher oligomerization temperatures. More particularly, when an oligomerization process of the invention is conducted in a temperature range from about 75° C. to about 150° C., a lower temperature within the range results in a change in selectivity toward lower boiling liquids such as gasoline. Conversely, raising the temperature of the process within the range controls the selectivity toward higher boiling liquid products such as diesel fraction.

The invention is further illustrated by the following examples which are illustrative of specific modes of practicing the invention and are not intended as limiting the scope of the invention defined by the appended claims.

EXAMPLE 1

Catalysts, designated as Catalyst A and B, are prepared in accordance with the invention.

Catalyst A is prepared as follows: A support containing overall 65 weight percent of silica and 35 weight percent of alumina is prepared by mulling approximately 82 parts by dry weight of an approximately 75/25 silica/alumina graft copolymer ($Al_2O_3$ precipitated via aluminum sulfate into the pores of a preformed silica gel) with approximately 18 parts by weight of hydrous alumina gel, followed by spray drying. The spray dried composite is then remulled with water and extruded through a die producing 1/16 inch cross-sectioned clover-leaf extruded matter, which, after being broken into extrudates of about 0.1 and 0.6 inch lengths, is oven dried at 110° C. for 2 hours and calcined at 649° C. for 2 hours.

The silica-alumina/alumina dispersion support particles (112.2 gms) are impregnated with a solution containing phosphoric acid (11.1 ml of conc. phosphoric acid in 68 ml of water). After impregnation by pore saturation, the catalyst is air dried for 4 hours and then oven dried for 16 hours. The catalyst is then calcined at 482° C. in flowing air for 16 hours. A final catalyst is produced having a nominal composition as follows: 4.3 weight percent of phosphorus components, calculated as P, with the balance comprising the silica-alumina/alumina dispersion support. The surface area is about 324 $m^2$/gm.

Catalyst B is prepared in a similar manner as Catalyst A, except the support particles contain no phosphorus. Catalyst B contains the same physical characteristics (including the same silica-alumina/alumina weight ratio) as in Catalyst A.

Catalyst C is a commercially available catalyst useful for oligomerization of propylene and contains about 23.0 weight percent of phosphorus components, calculated as P, and the balance of kieselguhr. Catalysts A, B and C are tested by contact with a gaseous feedstock containing 40 mol % propylene ($C_3H_6$) and 60 mol % propane under oligomerization conditions summarized below in Table II in a fixed bed downflow reactor to determine their activities for percentage conversion of feedstock to liquid products (oligomers including nonene and dodecene). The catalysts are each charged in separate runs to a reactor and utilized at 215° C. for about 4 days. Tables B, C and D below summarize data relating to feedstock conversion to nonene and tetramer liquid products as well as gasoline and diesel fractions.

TABLE II

| Propylene Oligomerization Conditions | |
| --- | --- |
| Temperature, °C. | 215 |
| Pressure, psig | 1,050 |
| Catalyst vol., cc | 10.5 |
| Catalyst size, mesh | 20–40 |
| WHSV, w/w-hr | |
| Propylene | 0.8 |
| Overall | 1.9 |
| LHSV, v/v-hr | |
| Propylene | 0.7 |
| Overall | 1.8 |

TABLE A

Conversion of Propylene to Oligomers with 4.3 wt. % P on 65/35 Silica-alumina/Alumina (Catalyst A)

| Cut hr | Conv. of $C_3H_6$ to Liquids, (wt. %) | Liquid Products (wt. %) nonene | tetramer | Fraction (wt %) Gasol. | Diesel |
| --- | --- | --- | --- | --- | --- |
| 16 | 86.7 | 8.3 | 14.9 | 63.2 | 54.8 |
| 24 | 86.3 | | | | |
| 32. | 79.7 | | | | |
| 40 | 84.2 | 9.8 | 15.9 | 67.0 | 53.0 |
| 48 | 83.8 | | | | |
| 56 | 79.9 | | | | |
| 64 | 82.8 | 11.1 | 16.5 | 70.4 | 50.8 |
| 72 | 82.2 | | | | |
| 80 | 79.3 | | | | |
| 88 | 83.5 | 12.1 | 16.8 | 73.0 | 48.5 |
| 96 | 80.5 | | | | |
| 104 | 79.5 | | | | |
| 112 | 78.5 | 13.9 | 17.1 | 75.4 | 46.6 |

TABLE B

Conversion of Propylene to Oligomers with 65/35 Silica-alumina/Alumina (Catalyst B)

| Cut hr | Conv. of $C_3H_6$ to Liquids, (wt. %) | Liquid Products (wt. %) nonene | tetramer | Fraction (wt %) Gasol. | Diesel |
| --- | --- | --- | --- | --- | --- |
| 16 | 67.7 | 12.1 | 16.0 | 72.0 | 47.9 |
| 32 | 64.3 | | | | |
| 40 | 56.7 | 15.7 | 16.1 | 76.0 | 44.3 |
| 48 | 52.9 | | | | |
| 56 | 52.5 | | | | |
| 62 | 51.0 | 19.3 | 16.7 | 80.9 | 39.1 |
| 70 | 49.8 | | | | |
| 72 | 49.2 | | | | |
| 86 | 48.2 | 20.9 | 16.8 | 82.9 | 37.5 |

TABLE C

Conversion of Propylene to Oligomers with 23 wt. % P on Kieselguhr (Catalyst C)

| Cut hr | Conv. of $C_3H_6$ to Liquids, (wt. %) | Liquid Products (wt. %) nonene | tetramer | Fraction (wt %) Gasol. | Diesel |
| --- | --- | --- | --- | --- | --- |
| 22 | 93.6 | 29.1 | 13.7 | 93.0 | 24.3 |
| 46 | 95.5 | 31.5 | 12.7 | 94.0 | 22.2 |
| 70 | 95.5 | 32.3 | 12.0 | 93.5 | 20.3 |
| 94 | 98.1 | 34.2 | 11.6 | 94.5 | 18.9 |

After each run the catalysts are unloaded from the reactor. In the case of Catalysts A and B, the particulates are free flowing and separable from each other as well as the walls of the reactor. In the case of the spent commercial Catalyst C, the integrity of the particulates is lost processing and the resulting mass removed by mechanically drilling such material from the reactor.

Essentially no pressure drop is observed during the runs promoted by Catalysts A and B whereas the run promoted by Catalyst C is stopped in less than 4 days due to the loss of integrity of the particulates and a substantial pressure drop.

The data in Table A indicate the phosphorus-containing catalyst of the invention exhibits a decline in activity from about 87% conversion to liquid products to about 80% liquid products after 4 days; however, the catalyst is highly stable over the last approximately 32 hours of the run.

In comparison to the results of Tables A and B, the selectivity toward nonene product and gasoline is substantially greater for the non-phosphorus-containing heterogeneous support catalyst of the invention (Catalyst B) compared to Catalyst A. In other words, the process catalyzed by Catalyst A converts substantially more of the feedstock to diesel product than that catalyzed by Catalyst B.

Furthermore, the proportions of the feedstock converted to diesel product in both Tables A and B are substantially greater than that in Table C.

EXAMPLE 2

Catalysts D and E of the invention are prepared in a similar manner to that of Catalyst A in Example 1, except the supports contain an overall ratio of silica to alumina which is approximately 45/55 and approximately 55/45, respectively. The catalysts are tested under the same conditions and with the same feedstock as in Example 1. Tables D and E below summarize data relating to conversion to nonene and tetramer liquid products as well as conversion to gasoline and diesel fractions.

TABLE D

Conversion of Propylene to Oligomers with 4.3 wt. % P on 45/55 Silica-alumina/Alumina (Catalyst D)

| Cut hr | Conv. of $C_3H_6$ to Liquids, (wt. %) | Liquid Products (wt. %) nonene | tetramer | Fraction (wt %) Gasol. | Diesel |
|---|---|---|---|---|---|
| 18 | 90.7 | 7.9 | 15.7 | 58.0 | 53.5 |
| 26 | 77.2 | | | | |
| 34 | 75.8 | | | | |
| 42 | 80.3 | 12.1 | 16.7 | 61.8 | 53.2 |
| 50 | 75.0 | | | | |
| 58 | 73.7 | | | | |
| 66 | 73.2 | 14.5 | 16.9 | 63.0 | 54.3 |
| 90 | 49.0 | 19.6 | 17.8 | 65.1 | 53.6 |
| 98 | 47.2 | | | | |
| 106 | 48.9 | | | | |
| 114 | 48.3 | 21.8 | 17.9 | 67.9 | 52.5 |

TABLE E

Conversion of Propylene to Oligomers with 4.3 wt. % P on 55/45 Silica-alumina/Alumina (Catalyst E)

| Cut hr | Conv. of $C_3H_6$ to Liquids, (wt. %) | Liquid Products (wt. %) nonene | tetramer | Fraction (wt %) Gasol. | Diesel |
|---|---|---|---|---|---|
| 16 | 79.6 | 8.2 | 14.9 | 63.5 | 53.6 |
| 24 | 78.5 | | | | |
| 32 | 80.3 | | | | |
| 40 | 77.8 | 10.5 | 16.4 | 69.1 | 52.2 |
| 48 | 72.4 | | | | |
| 64 | 77.1 | 12.0 | 16.7 | 72.5 | 48.8 |
| 80 | 72.5 | | | | |
| 88 | 70.8 | 13.8 | 17.1 | 75.5 | 46.3 |
| 96 | 69.9 | | | | |
| 104 | 65.6 | | | | |
| 112 | 70.7 | 15.5 | 17.1 | 77.7 | 43.8 |

As indicated in Table E, Catalyst E deactivates at about the same rate as Catalyst A in Example 1. Also, as indicated in Tables D and E, Catalyst D, containing a smaller overall ratio of silica to alumina than Catalyst E, deactivates at a faster rate than Catalyst E.

EXAMPLE 3

Catalyst F of the invention is prepared in the same manner as that of Catalyst E in Example 2, except the final catalyst contains 3.5 weight percent of phosphorus (calculated as P) on the support containing an overall silica to alumina ratio of 55/45. Catalyst G is prepared in the same manner as that of Catalyst E of Example 2, except the support particles contain no phosphorus. The catalysts are tested with the same feedstock and under the same conditions as in Example 1, except the temperature is 135° C. and both space velocities (WHSV and LHSV) are 1.1 for propylene and 2.77 overall. Tables F and G below summarize data relating to conversion to nonene and tetramer liquid products as well as conversion to gasoline and diesel fractions.

TABLE F

Low Temperature Conversion of Propylene to Oligomers with 3.5 wt. % P on 55/45 Silica-alumina/Alumina (Catalyst F)

| Cut hr | Conv. of $C_3H_6$ to Liquids, (wt. %) | Liquid Products (wt. %) nonene | tetramer | Fraction (wt %) Gasol. | Diesel |
|---|---|---|---|---|---|
| 31 | 84.1 | 17.8 | 22.2 | 70.9 | 54.0 |
| 39 | 83.7 | | | | |
| 55 | 83.9 | | | | |
| 63 | 83.5 | 22.5 | 29.8 | 72.6 | 52.6 |
| 87 | 85.9 | | | | |
| 111 | 85.7 | 22.4 | 29.3 | 72.8 | 52.2 |
| 138 | 81.5 | 22.4 | 28.7 | 73.4 | 51.7 |

TABLE G

Low Temperature Conversion of Propylene to Oligomers with 55/45 Silica-alumina/Alumina (Catalyst G)

| Cut hr | Conv. of $C_3H_6$ to Liquids, (wt. %) | Liquid Products (wt. %) nonene | tetramer | Fraction (wt %) Gasol. | Diesel |
|---|---|---|---|---|---|
| 45 | 28.7 | 35.2 | 18.8 | 87.5 | 31.8 |
| 69 | 32.7 | 32.1 | 19.5 | 93.0 | 35.3 |
| 93 | 32.4 | 30.6 | 19.8 | 84.7 | 36.9 |

As indicated in the comparison of Tables F and G, the phosphorus-containing catalyst exhibits substantially higher conversion activity to liquid products and greater selectivity toward tetramer and diesel fraction.

As further indicated in Table F, Catalyst F exhibits high activity and stability under the lower temperature conditions compared to the temperature conditions in Examples 1 and 2. Furthermore, the process employing Catalyst F produces a substantially greater proportion of tetramer than produced in Examples 1 and 2.

The non-phosphorus-containing Catalyst G, consisting essentially of the heterogeneous silica/alumina-alumina support, exhibits better stability at the lower temperature conditions than that of similar Catalyst B of Example 1. However, the selectivity toward diesel product for Catalyst G is less than that for either Catalyst B of Example 1 or Catalyst F above, but is still better than that of commercial Catalyst C in Example 1 (at a higher temperature).

While particular embodiments of the invention have been described, it will be understood, of course, that the invention is not limited thereto since many obvious modifications can be made, and it is intended to include within this invention any such modifications as will fall within the scope of the invention as defined by the appended claims.

We claim:

1. A catalyst comprising at least one phosphorus component supported on an amorphous porous dispersion of a silica alumina component in an alumina matrix, said dispersion being essentially free of supported metal components.

2. The catalyst defined in claim 1 wherein said silica-alumina component consists essentially of a cogel or copolymer comprising about 20 to about 96 weight percent $SiO_2$.

3. The catalyst defined in claim 1 consisting essentially of said dispersion and said phosphorus component.

4. The catalyst defined in claim 1 wherein the overall $SiO_2$ content of said dispersion is about 35 to about 80 weight percent.

5. The catalyst defined in claim 1 wherein said dispersion is a separate discrete component of a support comprising a porous refractory oxide.

6. The catalyst defined in claim 5 wherein said porous refractory oxide comprises a molecular sieve.

7. The catalyst defined in claim 1 wherein said phosphorus component comprises greater than about 0.5 weight percent, calculated as P.

8. The catalyst defined in claim 1 wherein said phosphorus component comprises about 1 to about 15 weight percent, calculated as P.

9. A catalyst comprising at least one phosphorus component supported on an amorphous porous dispersion of a silica-alumina component in an alumina matrix, said dispersion being essentially free of supported metals and having an overall $SiO_2$ content of about 5 to about 80 weight percent.

10. The catalyst defined in claim 9 wherein said silica-alumina component consists essentially of a cogel or copolymer comprising about 20 to about 96 weight percent $SiO_2$.

11. The catalyst defined in claim 10 consisting essentially of said dispersion and said phosphorus component.

12. The catalyst defined in claim 10 wherein the overall $SiO_2$ content of said dispersion is about 35 to about 80 weight percent.

13. The catalyst defined in claim 10 wherein said phosphorus component comprises greater than about 0.5 weight percent, calculated as P.

14. A catalyst consisting essentially of at least one phosphorus component on a porous support comprising a dispersion of about 5 to about 98 weight percent of an amorphous silica-alumina component dispersed in an alumina matrix.

15. The catalyst defined in claim 14 wherein said dispersion is essentially free of supported metals.

16. The catalyst defined in claim 15 wherein said silica-alumina component consists essentially of a cogel or copolymer comprising about 20 to about 96 weight percent $SiO_2$.

17. The catalyst defined in claim 16 wherein said dispersion is a separate discrete component of a support comprising a porous refractory oxide.

18. The catalyst defined in claim 17 wherein said porous refractory oxide comprises a molecular sieve.

19. The catalyst defined in claim 18 wherein said phosphorus component comprises greater than about 0.5 weight percent, calculated as P.

* * * * *